A. L. & A. S. FOLGER, & H. HENSHAW.
Evaporating Pan.
No. 80,819.                                   Patented Aug. 11, 1868.
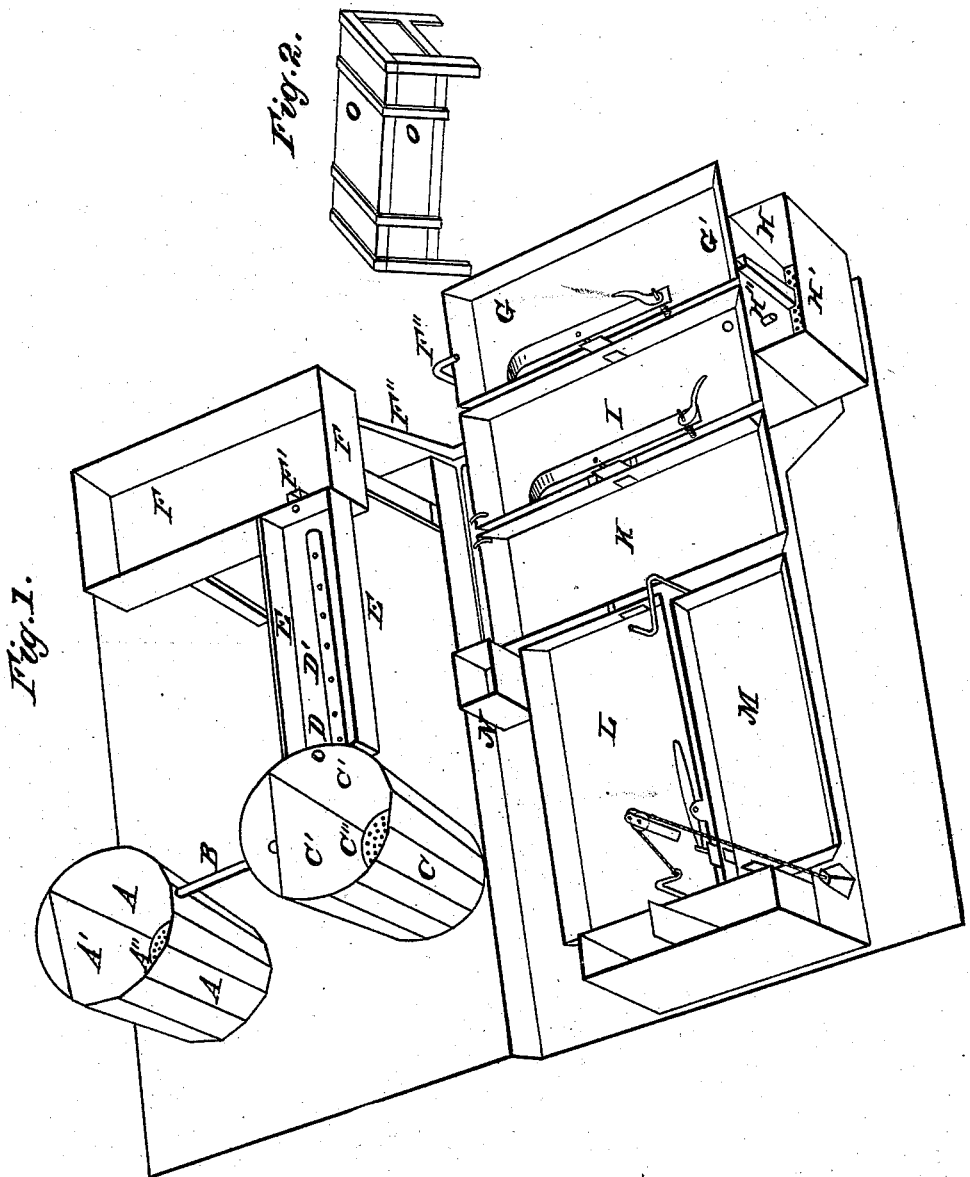

United States Patent Office.

ADDISON L. FOLGER, AND A. SMITH FOLGER, OF SUMNER, AND HENRY HENSHAW, OF QUAKERTOWN, INDIANA, ASSIGNORS TO A. L. FOLGER.

Letters Patent No. 80,819, dated August 11, 1868.

IMPROVEMENT IN THE MANUFACTURE OF SUGAR FROM SORGHUM-JUICE.

The Schedule referred to in these Letters Patent and making part of the same.

TO ALL WHOM IT MAY CONCERN:

Be it known that we, ADDISON L. FOLGER and A. SMITH FOLGER, of Sumner, in the county of Rush, and HENRY HENSHAW, of Quakertown, in the county of Union, and State of Indiana, have invented a new and useful Improvement in Apparatus for Manufacturing Sugar from the Juice of Sorghum and other plants; and we do hereby declare that the following is a full, clear, and exact description of the same, reference being had to the annexed drawings, making part of this specification, in which—

Figure 1 is a perspective view of the apparatus, and
Figure 2 is a perspective view of the granulator.

Our improvements have a particular relation to the evaporator described in the specification accompanying Letters Patent, No. 65,738, granted to Addison L. Folger, June 11, A. D. 1867, but may be applied to other evaporators; and they consist in the arrangement of filters and troughs, for purifying, by filtration and the deposit of sediment, the juices to be subjected to the action of the evaporator.

In the annexed drawings, A is the first filter, which is divided into two parts by a vertical partition, $A^1$, which rests upon a perforated diaphragm, $A^2$, extending across the tub, a few inches from the bottom. This perforated diaphragm is covered by any suitable filtering-material adapted for straining the impurities from the juices flowing through the same.

The juices being poured into the small compartment of the tub A, descend through the filtering-material, and, flowing through the perforated diaphragm, pass under the partition, and rise again through the filtering-material, filling the larger compartment of the tub, whence they flow through the pipe B into the second filter C, constructed like the first filter already described. Flowing through this filter, they flow into the pipe D, and thence through the horizontal pipe D' in the bottom of the trough E. The pipe D' is perforated above with small holes, through which the liquid juices rise into the trough E, the heavier impurities, not taken up by the filters, remaining deposited as a sediment in the pipe D'.

A further precipitation of sediment takes place in the trough F, from the top of which a pipe, F', conducts the liquid into the trough F, wherein a further precipitation will occur.

The series of filters or precipitating-troughs may be continued as far as may be found necessary.

The juices thus purified are conducted by the pipe F' into the first pan G of the evaporator.

The evaporator shown in the drawings is the one described in said patent of A. L. Folger, to which reference is made for a more complete description. We have made, however, certain improvements thereon, which we will describe.

H is the hot filter, into the bottom of which the liquid flows through the pipe G', extending below the perforated diaphragm $H^1$ in the bottom of the filter. This diaphragm is covered by a filtering-material, through which the fluid rises, flowing through the pipe $H^2$. Certain impurities existing in the juices cannot be extracted by filtration nor precipitation, and must be treated by adding water to the sirup, which is done by means of the reservoir N, connected, by pipes with stop-cocks, with all the pans in the series except the first. The space between the pans should be filled with plaster of Paris, or some similar concrete material. When the sirup has passed through the pans, if it is designed to manufacture it into sugar, it is then placed in the granulator O. This represents a transparent vessel of any form, which, containing the sirup, permits it to receive the action of rays of light, which we find to be the great efficient agent in the action of granulation.

We are aware that filters of the same general character have been heretofore employed by others, both as cold and hot filters, and we are also aware that precipitating-troughs have been used by others; we do not, therefore, claim any of these features broadly. Our invention is distinguishable from all others in these respects, viz:

First, we employ the transparent crystallizing-box for granulating, under the influence of solar light, the sugar placed therein.

Second, in the peculiar arrangement and construction of the purifier, consisting of a series of filters, constructed as described, and a series of precipitating-troughs with connecting-tubes, also constructed and arranged as described.

Third, in so arranging the apparatus as to subject the sirup, firstly, to purification in the filters; secondly, to precipitation in the troughs; thirdly, to further purification in the hot filter after it has passed through the first pan; and, fourthly, to a further treatment, when necessary, by cold water used in the evaporating-pans.

What we claim as our invention, and desire to secure by Letters Patent, is—

1. The arrangement of a consecutive series of filters, A C, and a consecutive series of precipitating-troughs and connecting-pipes, and of a series of evaporating-pans, two, at least, of which are connected through a hot filter, substantially as set forth.

2. In combination with a series of evaporating-pans, a water-cistern, N, and series of pipes for conducting the water into the pans, substantially as and for the purpose set forth.

3. A transparent granulator, O, substantially as and for the purpose set forth.

In testimony whereof, we have signed our names to this specification in the presence of two subscribing witnesses.

ADDISON L. FOLGER,
A. S. FOLGER,
HENRY HENSHAW.

Witnesses:
 LOT GREEN,
 JOSEPH M. ROSS.